US008033048B2

(12) United States Patent
Whitcomb (10) Patent No.: US 8,033,048 B2
(45) Date of Patent: Oct. 11, 2011

(54) PLANT CONTAINER AND SIDEWALL PROVIDING IMPROVED MANAGEMENT OF IRRIGATION AND AERATION

(75) Inventor: Carl E. Whitcomb, Stillwater, OK (US)

(73) Assignee: Lacebark, Inc., Stillwater, OK (US)

( * ) Notice: Subject to any disclaimer, the term of this patent is extended or adjusted under 35 U.S.C. 154(b) by 1249 days.

(21) Appl. No.: 10/770,352

(22) Filed: Feb. 2, 2004

(65) Prior Publication Data

US 2004/0200141 A1    Oct. 14, 2004

Related U.S. Application Data

(63) Continuation of application No. 10/075,096, filed on Oct. 29, 2001, now Pat. No. 7,810,275.

(51) Int. Cl.
*A01G 9/02* (2006.01)
(52) U.S. Cl. ......................................... 47/32.7; 476/65.7
(58) Field of Classification Search ............... 47/32.7, 47/32.8, 65.7, 65.8, 73, 74, 78
See application file for complete search history.

(56) References Cited

U.S. PATENT DOCUMENTS

| | | | |
|---|---|---|---|
| 560,966 A | 5/1896 | Brown | |
| 754,948 A | 3/1904 | White | |
| 1,011,445 A | 12/1911 | Killion | |
| 2,209,778 A | 7/1940 | Krasowski | |
| 2,405,056 A | 7/1946 | Rosenbloom | |
| 2,626,483 A | 1/1953 | Service | |
| 2,829,742 A | 4/1958 | Wallace | |
| 2,848,842 A | 8/1958 | Tennant, Jr. | |
| 3,052,063 A | 9/1962 | Dunn | |
| 3,080,680 A * | 3/1963 | Reynolds et al. ................. 47/74 |
| 3,094,810 A | 6/1963 | Kalpin | |
| 3,291,437 A | 12/1966 | Bowden et al. | |
| 3,798,837 A | 3/1974 | Oehmke et al. | |
| 3,951,294 A | 4/1976 | Wilson | |
| 4,250,661 A | 2/1981 | Kodera et al. | |
| 4,442,628 A | 4/1984 | Whitcomb | |
| 4,497,132 A | 2/1985 | Whitcomb | |
| 4,508,776 A | 4/1985 | Smith | |
| 4,510,712 A | 4/1985 | Whitcomb | |
| 4,574,522 A | 3/1986 | Reiger et al. | |

(Continued)

FOREIGN PATENT DOCUMENTS

DE    4024406 A  *  2/1992

(Continued)

OTHER PUBLICATIONS

Definition of bond from www.dictionary.com, Mar. 15, 2009.*

(Continued)

*Primary Examiner* — Son T Nguyen
(74) *Attorney, Agent, or Firm* — Jeffrey L. Streets; Streets & Steele (57) ABSTRACT

A plant container and sidewall comprising a nonporous root-tip-trapping region and a porous air-root-pruning region combined to form the sidewall. The most preferred configuration has the root-tip-trapping region forming a contiguous upper portion of the sidewall and the air-root-pruning region forming the lower portion of the sidewall. Preferably, the root-tip-trapping region will form between ½ and 9/10 of the sidewall, most preferably between ⅔ and ¾ of the sidewall. The advantages of the unique sidewall construction include preventing root circling, promoting water conservation, eliminating perched water tables, and providing proper aeration. These advantages promote plants that are healthier overall and grow faster.

56 Claims, 3 Drawing Sheets

U.S. PATENT DOCUMENTS

| | | | |
|---|---|---|---|
| 4,646,467 A | | 3/1987 | Morrisroe |
| 4,716,680 A | * | 1/1988 | Whitcomb et al. ............... 47/73 |
| 4,730,953 A | | 3/1988 | Tarko |
| 4,753,037 A | | 6/1988 | Whitcomb |
| 4,818,585 A | | 4/1989 | Shipp, Jr. |
| 4,829,707 A | | 5/1989 | Koffler |
| 4,884,367 A | | 12/1989 | Lawton |
| 4,920,692 A | | 5/1990 | Kitamura et al. |
| 4,920,695 A | | 5/1990 | Garden |
| 4,939,865 A | | 7/1990 | Whitcomb et al. |
| 5,099,607 A | | 3/1992 | Lawton |
| 5,131,185 A | | 7/1992 | Wingerden |
| 5,181,952 A | | 1/1993 | Burton et al. |
| 5,205,432 A | | 4/1993 | Gullan |
| 5,241,784 A | | 9/1993 | Henry |
| 5,262,233 A | | 11/1993 | Sudo et al. |
| 5,301,465 A | | 4/1994 | Caferro |
| 5,311,700 A | | 5/1994 | Thomas |
| 5,327,679 A | | 7/1994 | Hawthorne |
| 5,402,600 A | | 4/1995 | Tompkins |
| 5,533,301 A | | 7/1996 | Weder et al. |
| 5,544,447 A | | 8/1996 | Easey et al. |
| 5,557,886 A | | 9/1996 | Whitcomb |
| 5,575,112 A | | 11/1996 | Scheubel |
| 5,605,012 A | * | 2/1997 | Weder et al. ..................... 47/64 |
| 5,636,502 A | | 6/1997 | Weder et al. |
| 5,768,825 A | | 6/1998 | Reiger |
| 5,852,896 A | | 12/1998 | Flasch, Jr. |
| 5,937,577 A | | 8/1999 | Butler et al. |
| 5,983,566 A | | 11/1999 | Enderlein et al. |
| 6,108,974 A | | 8/2000 | Herzog-Mesrobian et al. |
| 6,142,299 A | | 11/2000 | Weder et al. |
| 6,161,332 A | | 12/2000 | Avôt |
| 6,195,938 B1 | | 3/2001 | Kay |
| 6,202,348 B1 | | 3/2001 | Reiger |
| 6,223,466 B1 | | 5/2001 | Billings |
| 6,311,443 B1 | | 11/2001 | Allazetta |
| 6,453,610 B2 | | 9/2002 | Tonkin et al. |
| 6,481,593 B2 | | 11/2002 | Banhagel |
| 6,612,072 B2 | | 9/2003 | Busby et al. |
| 2002/0038526 A1 | | 4/2002 | Garrofe Morreres |

FOREIGN PATENT DOCUMENTS

| | | | | |
|---|---|---|---|---|
| DE | 4326293 A1 | * | 2/1995 | |
| EP | 300578 | * | 1/1989 | ..................... 47/65.7 |
| EP | 300578 A3 | | 1/1989 | |
| FR | 2755950 A1 | | 5/1998 | |
| GB | 2073567 A | | 10/1981 | |
| GB | 2129664 A | | 5/1984 | |
| JP | 406189635 | | 7/1994 | |
| JP | 406269228 A | | 9/1994 | |
| JP | 2001352843 | | 12/2001 | |
| SE | 141561 A | | 8/1953 | |
| WO | WO 97/00005 | | 1/1997 | |
| WO | WO 97/21339 | | 6/1997 | |
| WO | WO 01/35722 A1 | | 5/2001 | |

OTHER PUBLICATIONS

Superoots™ root enhancement system; superoots products; The Caledonian Tree Co.; Cowbraehill Tynehead Pathhead Midlothian; EH37 5 XT; Scotland UK; 5 pgs. regarding superoots fielder™ ; www.superoots.com.

McGraw-Hill Dictionary of Scientific and Technical Terms Sixth Edition, p. 423 and p. 1636; Copyright © 2003, 1994, 1989, 1978, 1976, 1974 by McGraw-Hill Companies, Inc.

Carl E. Whitcomb, Ph.D., Plant Production in Containers II, pp. 486-489.

www.psrc.usm.edu/macrog/pp.htm; "Polpropylene"; 3 pgs.

Carl Erwin Whitcomb, "Effects of Root Competition Between Trees and Turfgrass", An Abstract of a Dissertation submitted to the Graduate Faculty in Partial Fulfillment of the Requirements for the Degree of Doctor of Philosophy, p. 1-3, 52.

Carl E. Whitcomb, Eliot C. Roberts, and Roger Q. Landers, A Connecting Pot Technique for Root Competition Investigations Between Woody Plants or Between Woody and Herbaceous Plants, Ecology, vol. 50, No. 2, Early Spring 1969, p. 326-328.

Carl E. Whitcomb and Eliot C. Roberts, "Competition Between Established Tree Roots and Newly Seeded Kentucky Bluegrass", Agronomy Journal, vol. 65, Jan.-Feb. 1973, p. 126-129.

Ralph Reiger and Carl E. Whitcomb, "A Root Control System for Growing and Transplanting Trees", Ag Exp Sta Report, p. 843, 1983.

Carl Whitcomb, "Fabric liners to stop root circling in containers", unavailable paper published in 1983, but referenced on, p. 341-342 of book by Carl Whitcomb, Plant Production in Containers II, 2003.

Carl E. Whitcomb, "Root Development of Trees Grown in Field-Grow Fabric Containers Following Transplanting", Okla. State U. Ag Exp. Sta Research Report, p. 872, 1985.

Paper: Published in 1968 or 1969 copy unavailable. Subject: Using quart milk cartons with or without bottoms removed for growing tree seedlings. The milk cartons were positioned on a raised wire frame to prevent roots from growing into the soil below. This may have been the first situation where air-root-pruning occurred.

Jim Ward and Carl E. Whitcomb, Nursery Problems Solutions Through Research, Jun. 21, 1972, Experiment #13, "Effects of Time of Potting and Root Pruning on Growth and Root Distribution of Loquat Seedlings", p. 24-25.

Carl E. Whitcomb, "Growth of *Carissa grandiflora* 'Boxwood Beauty' in varying media, containers and micronutrient levels", 9 pages, circa 1971.

Carl E. Whitcomb, Experiment #14, "Effects of Container Sidewall Porosity, Growing Media and Presence or Absence of Micronutrient Fertilizer on Root and Top Growth of *Carissa grandiflora* Var. Boxwood Beauty", Nursery Problems Solutitions Through Research, Jun. 5, 1971.

Randy E. Davis and Carl E. Whitcomb, "Effects of Propagation Container Size on Development of High Quality Seedlings", Reprint from The International Plant Propagators' Society, vol. 25, 1975.

Robert S. Birchell and Carl E. Whitcomb, "Effects of Container Deisgn on Root Development and Regeneration", Nursery Research Field Day, Ag Exp Sta, OK State Univ, Oct. 1977, Research Report p. 760.

Robert D. Hathaway and Carl E. Whitcomb, "The Effects of Root Malformation During Propagation on Growth and Survival of Bur Oak", Nursery Research Field Day, Ag Exp Sta, OK State Univ, Oct. 1978, Research Report p. 777.

Sancho Dickinson and Carl E.Whitcomb, "Effects of Container Design on Root Quality", Nursery Research Field Day, Ag Exp Sta, OK State Univ, Oct. 1978, Research Report p. 777.

Elizabeth Williams and Carl E. Whitcomb, "Effects of Growing Media and Container Design on Growth of Tree Seedlings", Nursery Research Field Day, Ag Exp Sta, OK State Univ, Oct. 1979, Research Report p. 791.

John D. Gibson and Carl E. Whitcomb, "Producing Tree Seedlings in Square Bottomless Containers", Ornamentals South, Aug. 1980, p. 12-15.

Carl E. Whitcomb, "Effects of Container and Production Bed Color on Root Temperatures and Plant Growth", Nursery Research Field Day, Ag Exp Sta, OK State Univ, Oct. 1980, Research Report p. 803.

Steve Wall and Carl E. Whitcomb, "A Comparison of Commercial Containers for Growing Tree Seedlings", Nursery Research Field Day, Ag Exp Sta, OK State Univ, Oct. 1980, Research Report p. 803.

Carl E Whitcomb, "Growing Tree Seedlings in Containers", Bulletin 755 Jan. 1981 Agricultural Experiment Station Div of Ag, OK State Univ, p. 18.

Carl E. Whitcomb, "An "Easy" Way to Grow Specimen Trees in the Field", Nursery Research Field Day, Ag Exp Sta, OK State Univ, Oct. 1981, Research Report p. 818.

Carl E. Whitcomb, "A Vertical Air-Root-Pruning Container", Reprints—vol. 31 International Plant Propagators Society Combined Proceedings for 1981, p. 591-596.

Carl E. Whitcomb, "Inproving Root System Quality", Reprint from Research Report p. 829 of the OK Ag Exp. Sta. Oct. 1982.

Ben Davis III and Carl E. Whitcomb, "Growing Pecan Seedlings in Containers", Reprint from Research Report p. 829 of the OK Ag. Exp. Sta. Oct. 1982.

Robert D. Hathaway and Carl E. Whitcomb, Nutrition and Performance of Container-Grown Japanese Black Pine Seedlings, J. Environ. Hort. 2 (1):9-12. Mar. 1984.

Robert D. Hathaway and Carl E. Whitcomb, "Container-Grown Pecan Seedlings Good Nutrition, Root Pruning Technique to Get Seedlings Off to Quick Start", Pecan South, Jan. 1985, p. 14-19.

Carl E. Whitcomb, Roots for The Future, The International Plant Propagators' Society, Combined Proceedings vol. 39, 1989, p. 170-173.

Dr. Carl Whitcomb, "The Rootmaker Container", Florida Nurseryman Oct. 1989, p. 23-29.

"Container designed to aid plant's root development", Nursery Manager, Apr. 1991, p. 22.

Carl E. Whitcomb, "Top Ten PoInts of Plant Propagation", Combined Proceedings International Plant Propagators' Society, vol. 48, 1988, p. 558-561.

Carl E. Whitcomb, "Avoiding the Staking Delemma", published in the International Plant Propagators Soc. Proceedings, vol. 50, 2000.

Carl Whitcomb, "Seedling Development: The Critical First Days ©", Combined Proceedings International Plant Propagators' Society, vol. 51, 2001 p. 610-614.

Carl E. Whitcomb, Containers vs. Poly Bags—Which are better?, Reprinted from the Jan. 1, 1983, container production special issue of American Nurseryman.

Carl E. Whitcomb and Jerry D. Williams, "Stair-step Container for Improved Root Growth", HortScience 20(1) 66-67, 1985.

Dr. C. E. Whitcomb, "Effects of pot sizes on rooting of juniper cuttings", Jan. 15, 1974, p. 15, 73-74.

James D. Ward and Carl E. Whitcomb, "Nutrition of Japanese Holly during Propagation and Production", J. Amer. Soc. Hort. Sci 104(4)p. 523-526. 1979.

Carl E. Whitcomb, "Effect of Micronutrient Nutrition During Propagaton on Container Plant Production", Reprints vol. 30 International Plant Propagators' Society Combined Proceedings for 1980, p. 468-473.

Carl E. Whitcomb, Allan Storjohann and William D. Warde, "Micromax—Micronutrients for Improved Plant Growth", Reprints vol. 30 International Plant Propagators' Society Combined Proceedings for 1980, p. 462-467.

Carl E. Whitcomb, Ralph Reiger and Mike Hanks, "Growing Trees in Wire Baskets", Journal of Ariculture 7 (6): Jun. 1981, p. 158-160.

Frank E. Babcock and Carl E. Whitcomb, "N-P-K Effects on Tree Seedling Growth", Agriculture Exp. Sta. OK State University Research Report p. 843, 1983.

Carl E. Whitcomb, "Why Large Trees Are Difficult to Transplant", Journal of Arboriculture 9(2): Feb. 1983, p. 57-58.

Michael Carney and Carl E. Whitcomb, "Effects of 2 Slow-Release Fertilizers on the Propagation and Subsequent Growth of 3 Woody Plants", J. Environ. Hort. 1(3):p. 55-58, Sep. 1983.

Bonnie Lee Appleton and Carl E. Whitcomb, "Effects of Container Size and Transplanting Date on the Growth of Tree Seedlings", J. Environ. Hort. 1(4):p. 89-93. Dec. 1983.

C. Chris Threadgill, Carl e. Whitcomb and Ronald McNew, "Effects of Propagation Container Dimensions and Media on the Growth of 4 Nursery Crops", J. Environ. Hort. 3(3):p. 126-131 Sep. 1985.

Whitcomb, Carl E., "Plant Production in Containers", Copyright 1984 by Carl E. Whitcomb, revised 1988.

Whitcomb, Carl E. "Plant Production in Containers II", Copyright 1984 by Carl e. Whitcomb, revised 1988 and 2003; pp. 486-489.

* cited by examiner

PLANT CONTAINER AND SIDEWALL PROVIDING IMPROVED MANAGEMENT OF IRRIGATION AND AERATION

This application is a continuation of U.S. application Ser. No. 10/075,096, filed on Oct. 29, 2001 now U.S. Pat. No. 7,810,275.

BACKGROUND OF THE INVENTION

1. Field of the Invention

This invention relates generally to plant containers and root growth barriers, such as for use with landscape plants such as trees and shrubs prior to transplanting.

2. Background of the Related Art

Transplantable plants for use in landscaping, such as trees and shrubs, are generally initially grown in conventional smooth-walled containers made of plastic, steel or other materials. However, when a root contacts the inner sidewall of a smooth walled container the root is deflected and follows the curvature of the container. The result is the production of only a few secondary branch roots. In some cases, roots make several revolutions around the container, mostly at the bottom, forming a coil. The result is an abnormal root system that does a poor job of establishing and supporting the plant following transplanting. Impaired root development following transplanting restricts growth of any species. Poor root development and anchorage is especially detrimental to trees that grow to considerable height and where stresses from wind, ice and snow are exaggerated.

Whitcomb (U.S. Pat. Nos. 4,442,628; 4,510,712; 4,753,037; 4,939,865; and 5,557,886) teaches various sidewall designs with strategic placement of openings in above ground containers to accomplish air-root-pruning (root tip dehydration pruning) to stop root circling and stimulate root branching. These containers work by guiding an actively growing root tip, which is white soft tissue, into an opening where the root tip dehydrates, dies and is, therefore, effectively pruned. The effect on the root system is the same as when a plant is pruned above ground, for example, to make a hedge. Each time the plant is pruned above ground, secondary branches form back as far as about four inches from the point of pruning and through a succession of prunings, a dense plant hedge or screen can be created. An identical phenomenon is seen to occur with roots for the same physiological reasons. Such air-pruning container designs have been successful and are currently sold in various sizes (available under the Rootmaker™ and RootBuilder™ trademarks from RootMaker Products Co., LLC of Huntsville, Ala.).

Van Wingerden (U.S. Pat. No. 5,131,185), Lawton (U.S. Pat. No. 5,099,607) and Henry (U.S. Pat. No. 5,241,784) also teach air-root-pruning by container sidewall design. Butler (U.S. Pat. No. 5,937,577) teaches air-root-pruning as a result of constructing a container out of chicken wire and lining the inside with a woven polyester fabric. Butler (U.S. Pat. No. 5,937,577) does accomplish air-root-pruning throughout the circumference of the container, but the salt accumulation due to the high loss of water to evaporation makes it less efficient in terms of conserving water. This design is generally only practical to use where irrigation water quality is good and humidity is high.

Whitcomb (U.S. Pat. No. 4,497,132) teaches that when root tips are trapped in a saw tooth-like recess as part of the container wall and cannot extend, root tips cease to grow and root branching results. Root circling is reduced and root branching is improved. However, despite the improvements shown by Whitcomb '132, some spiral root growth is still seen to occur because there are limited number of root-tip-trapping points, and the growth of lateral roots and development of the lateral root tips is not optimal. Once roots occupy all of the root-tip-trapping recesses, as in the '132 container, additional roots may circle and branch poorly in much the same manner as in a conventional container.

Reiger (U.S. Pat. No. 5,768,825) discloses the use of a monolayer of fabric sewn into the shape of a plant preservation and growth control bag. A porous fabric is employed, which restricts the growth of a plant preparatory to transplantation, by catching the roots in the recesses of the fabric. This permits fewer roots to emerge from a layer of fabric, but those that do are prevented from developing further by "girdling" or constriction pruning as a result of fabric entanglement. However, this method is restricted for use during the short time when plants are to be preserved for transplantation and is not suitable for longer-term growth and maintenance. Removal of fabric from plants placed in this system more than a few months is nearly impossible as roots grow through the fabric and develop on the opposite side. Optimal root growth is not maintained because the roots must be broken off at the inside face of the fabric or in the fabric when the fabric is removed. Further, the invention of Reiger ('825) must be used inside a conventional container or in the soil to avoid severe water loss due to evaporation through the fabric.

Therefore, a need exists for a root growth barrier or container for the purposes of encouraging healthy and abundant root growth and permitting optimal development and growth of lateral roots and root tips. It would be desirable if the barrier could provide improved management of water and oxygen within the container. It would also be desirable if the barrier could provide a much greater number of pruning elements, such as root-tip-trapping elements and air-root-pruning elements.

SUMMARY OF THE INVENTION

The present invention provides a sidewall for a plant container and a plant container incorporating the sidewall. The sidewall comprises a root-tip-trapping region, such as a bilayer material described below, and an air-root-pruning region, wherein the regions are combined to form the sidewall. The root-tip-trapping and air-root-pruning regions may be configured in various patterns such as rows, columns, dots, checkerboard and the like. However, the most preferred configuration has the root-tip-trapping region forming a contiguous upper portion of the sidewall and the air-root-pruning region forming a lower portion of the sidewall. Preferably, the root-tip-trapping region will form the upper half of the container. Most preferably, the root-tip-trapping region will form between ⅔ and ¾ of the sidewall.

The root-tip-trapping region is preferably formed by two layers bonded to one another to form a bilayer material. The bilayer material includes a root-tip-trapping layer that prevents the root tips from circling and a layer consisting of a root-impenetrable material formed onto a surface of the root-tip-trapping layer to prevent further advancement of the root tips. The root-tip-trapping layer is preferably a fabric, such as a spun bonded and needle punched fabric, a woven fabric, or a knitted fabric. The root-impenetrable material is preferably a polymer film, such as polyethylene, that is bonded to the root-tip-trapping layer. The root-impenetrable layer is preferably also water-impenetrable or water-impermeable.

The air-root-pruning region is preferably formed with the same type of material as the root-tip-trapping layer of the root-tip-trapping region. Accordingly, the air-root-pruning material is preferably a fabric, such as a spun bonded and needle punched fabric, a woven fabric, or a knitted fabric.

The present sidewall is preferably used to form a freestanding plant container, for example a container with vertical sides and a flat bottom. Alternatively, the sidewall or the container may be placed in other pots or containers, or in open soil. The barrier may also be comprised of biodegradable materials for use in the root-tip-trapping layer, the root-impenetrable layer, or both layers. Biodegradable materials may be, for example, selected from wood, fiber, starch, polyhydroxyalkanoates, polycaprolactone, polylactide aliphatic copolymer, polylactide, aliphatic polyester, an aliphatic-aromatic copolymer, and combinations thereof.

A method of using the sidewall or container to grow a plant is also provided. The method may be employed with rolls of the sidewall material. The method comprises the steps of disposing a layer of the sidewall material adjacent to a growth medium and providing a plant in the medium. The method may also be adapted to grow the plant in-ground, wherein the method comprises the steps of placing growth medium in a container including the sidewall material, disposing the container in soil, and adding a plant in the growth medium.

Other objects, features and advantages of the present invention will be apparent from the following detailed description when read in conjunction with the drawings and appended claims.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

One embodiment of the present invention provides a sidewall for a plant container and a plant container incorporating the sidewall. The sidewall comprises a first region that is nonporous or water-impermeable and a second region that is porous or water-permeable. Preferably, the first region of the sidewall comprises a nonporous root-tip-trapping region, such as the bilayer material described above, and the second region comprises a porous air-root-pruning region, wherein the first and second regions are combined to form the sidewall. The root-tip-trapping and air-root-pruning regions may be configured in various patterns such as rows, columns, dots, checkerboard and the like. Accordingly, the sidewall may have two or more root-tip-trapping regions, or two or more air-root-pruning regions. However, the most preferred configuration has the root-tip-trapping region forming a contiguous upper portion of the sidewall and the air-root-pruning region forming the lower portion of the sidewall. Preferably, the root-tip-trapping region will form between ½ and ⁹⁄₁₀ of the sidewall, most preferably between ⅔ and ¾ of the sidewall.

A particularly preferred sidewall comprises a layer of porous fabric and a layer of water impermeable, root-impenetrable material disposed over only a portion of the outer face of the fabric layer. The water-impermeable, root-impenetrable layer may be disposed over the porous fabric layer in any configuration and over any portion as described above, but is preferably formed over the upper half to ⁹⁄₁₀ of the porous fabric layer. In the manner described, a single sheet of the water permeable, porous fabric may provide both the porous region of the sidewall and the inner layer of the bilayer material of the nonporous region of the sidewall.

It should be recognized that the root-tip-trapping region(s) and the air-root-pruning region(s) of the sidewall or container formed therefrom may be made from materials that are flexible, rigid, or a combination thereof. One example of flexible materials is provided by the composite fabric sidewall describe herein and in U.S. patent application Ser. No. 10/075,096, filed by the present inventor on Oct. 29, 2001, which patent is incorporated by reference herein. Another example of a suitable material that is also flexible is found in U.S. Pat. No. 4,939,865, incorporated by reference herein, and the copending U.S. patent application Ser. No. 10/446,987 filed by the present inventor on May 27, 2003, also incorporated by reference herein. The latter two references describe bendable sheets having protuberances for air-root pruning and the sheets are sufficiently flexible to be bent and secured into a cylindrical shape for use as a container sidewall. In accordance with the present embodiment of the invention, a portion of the protuberances may have the outwardly extending distal end closed to form a root-tip-trapping region in combination with a region of open-ended air-root-pruning protuberances. Furthermore, the root-tip-trapping region could be formed with or without the protuberances by bonding a suitable porous fabric material to the inside surface of the sheet. It should also be recognized that these and similar configurations could be made rigid by increasing the thickness of the polymer material, changing the material of construction, or providing reinforcement.

The sidewall materials disclosed herein may be formed as ready-made containers, or as sheets for assembly into containers in the field. Where the sidewalls of the present invention are made with fabrics or thin ply sheets, a container may be formed by fastening one or more sidewall sections or panels together, for example by sewing, gluing, plastic welding, bonding, and the like.

Regardless of how the sidewalls or containers are constructed, the porous region is preferably disposed along the lower edge of the sidewall in order to improve water drainage from the container. Poor drainage can cause a water table that is 'perched' above the bottom of the container, holding excess water and blocking oxygen to the roots. Having a water permeable region along the lower edge of the sidewall not only reduces the water table, but also allows air-root-pruning to occur. After rain or irrigation has stopped, water will continue to exit slowly through the water permeable region until the pressure of the water in the upper part of the container no longer puts sufficient pressure on water at the bottom to overcome adhesive and cohesive forces that hold water in. The growth medium in the upper portion of the container is initially moist but also well-aerated, because air is sucked into the upper portion of the medium as water exits the growth medium in the lower portion of the container. Over time, evaporation of water from the exposed upper surface of the growth medium, as well as the use of water by plants, causes the upper portion of growth medium to dry and water from the lower portion to be wicked upward. The water impermeable layer in the root-tip-trapping region of the sidewall reduces water loss from the upper region of the growth medium. The water permeable, porous fabric forming the air-root-pruning region of the sidewall allows drainage of any excess water during and immediately following irrigation, then allows for air uptake into the growth medium during evaporation and use of the water from the growth medium. The present sidewall and container provides these water and oxygen management advantages in combination with the advantages of a root-pruning container.

By adjusting the container's ratio of the surface area of water permeable material to the surface area of water impermeable material it is possible to obtain an appropriate balance of water drainage and oxygen concentration, on the one hand, and water retention, on the other hand. Because certain species of plants are more sensitive to low oxygen and excess water, such as pine tree species and related conifers and a few deciduous plants such as flowering dogwoods and redbuds, the use of the water permeable material in the sidewall greatly improves the conditions for growing these plants. It is believed that the conditions caused by the sidewall will also improve the growth of many other plant species as well.

One embodiment of the invention has a root-tip-trapping region provided by a porous fabric layer and a root-impenetrable layer bonded together. Most preferably, the root-impenetrable layer is also water-impermeable. Multiple porous fabric and root-impenetrable layers are also envisioned. The bonding may be accomplished in a variety of ways, such as lamination or by means of an adhesive.

The advantages of the present sidewall and container include increasing root branching, eliminating root circling, decreasing the amount of water needed, improving aeration, reducing root zone soil temperature, improving transplantation of plants to another medium, and generally improving the health and accelerating the growth of the plants. Plants may be grown in said containers for a time period ranging from a few months to several years and ranging from a small size to a very large size. It is an important aspect of this invention that the sidewall and container combine root-tip-trapping and air root pruning to achieve improved conditions for root growth.

The layer or layers of porous fabric forming part of the root-tip-trapping region may be any fabric that, when bonded to a layer of a root-impenetrable material on one side surface (i.e. face-to-face), will provide the bilayer composite with the capacity to trap an actively growing root tip between the fabric's fibers (within the fabric's openings) and against the root-impenetrable material. The fabric fibers need only be thick enough so as to trap the root tip against the root-impenetrable material to stop further root extension. The fibers may be free, looped, knitted, woven or spun bonded so long as the fibers do not deform or stretch when a root pushes against it and provides for high numbers of root tips to become trapped in the openings on the fabric surface. Even degradable fabrics such as cotton may be used, when the period of root control need only be brief (i.e. confined to one or two months). The degradability of the fabric is especially advantageous in situations where root growth need only be optimized during a short critical period. While the fabric may be made from various materials, the fabric is preferably a polymer such as polypropylene, polyester, nylon, or other olefin. Preferably, a spun bonded needle punched fabric may be used. Preferably, the fabric has a weight ranging from 1 to 10 ounces per square yard, and more preferably ranging from 4 to 6 ounces per square yard. To shield the soil or other growth medium from the effects of light and UV radiation, the root-tip-trapping material is preferably a dark color, most preferably black. It is also preferable for the fabric to have openings of less than $\frac{1}{4}$ inch, depending on the plants to be grown adjacent the barrier. For stimulating the root growth of woody dicotyledons, such as willow and oak trees, the openings preferably have a diameter of between $\frac{1}{16}$ inch and $\frac{1}{4}$ inch. Openings with a diameter smaller than $\frac{1}{16}$ of an inch are well-suited for use with herbaceous dicotyledons such as tomatoes and petunias. A similar description of this material and its uses is found in U.S. patent application Ser. No. 10/075,096, filed by the present inventor on Oct. 29, 2001, which patent is incorporated by reference herein.

The root-impenetrable material may be any material that does not permit root penetration, such as films, dense fabrics, aluminum or other metal foil, and plastic sheets. Preferably, the root-impenetrable material is also water-impermeable to prevent water loss therethrough. The root-impenetrable layer may also be formed by any composition, including polymers, inorganics, and composites, with polymers being the most preferred. Polymers such as vinyl, or polyolefins such as polyethylene, polypropylene, polyisobutene, poly but-1-ene, and poly 4-methyl-pent-1-ene may be used. Preferably, the root-impenetrable layer has a reflective and light colored coating or surface. Most recommended is a white polyethylene layer coating or surface.

The composition of the root-impenetrable material may also comprise additives. For example, where the root-impenetrable material is a polymer, the polymer will preferably include UV inhibitors to provide high UV stability. In a most preferred embodiment, the root-impenetrable material forming the outer layer of a bilayer root growth barrier comprises white polyethylene having a thickness of 2-6 mils and with UV inhibitors for stability. Additionally, the root-impenetrable material may be rigid or flexible and have any desired thickness, including as thick as 2-6 mils, more preferably 3-5 mils.

As mentioned, bonding layers of the root-impenetrable material and the porous fabric may be accomplished by various means, including lamination or using an adhesive. For example, an outer white polyethylene layer may be glued to an inner fabric layer that is either spun bonded and needle punched or a woven or knitted fabric. Any glue may be used, provided it is water-insoluble. Furthermore, any lamination techniques may be used, provided that the lamination temperature employed does not melt or otherwise damage the porous fabric layer. Alternatively, one of the layers may be formed directly onto the other layer, such as the root-impenetrable material being sprayed or poured over the root-tip-trapping layer.

In an alternative embodiment, it may also be possible to stretch-wrap or shrink-wrap a water conserving and root-impenetrable layer to the fabric layer. However, the use of these layers must generally be applied over the fabric layer of a container after the container has been filled with growth medium so that the stretch-wrap or shrink-wrap may be placed in tension against the fabric without deforming or collapsing the container. While bonding of the layers is preferred, these wrapped layers will still provide substantial water conserving and root trapping benefits to a container that would otherwise comprise only an air-root-pruning fabric. For example, the wrapped layer will prevent evaporative losses, described earlier. Accordingly, the wrapped layer is preferably positioned over the upper region of the container sidewall in the same manner as described earlier with respect to the root-tip-trapping region. Optionally, the wrapped layer may be applied around the fabric layer following a period of plant growth when the water needs of the plant are greater. Similarly, while the entire sidewall and/or bottom could potentially be wrapped, it is preferred to leave the lower 1/10 to 1/2 of the sidewall unwrapped to allow water drainage and aeration as previously described with respect to the air-root-trapping region. Furthermore, the wrapped layer may provide some degree of root-tip-trapping. However, since the wrapped outer layer is not bonded to the fabric layer, it is preferable for the wrap to have sufficient strength to minimize the number of roots that would either penetrate the wrap or squeeze between the fabric layer and the wrap layer and begin to circle. Examples of suitable wrap materials include low density polyethylene, polypropylene, polybutylene, and polyvinylchloride.

The sidewall may be used to form containers wherein plants may be placed and grown for shorter or longer periods of time. The containers may have any shape or size. In a preferred embodiment of the invention, the container is cylindrical in shape. This is particularly advantageous in that it provides vertical sides and a flat bottom portion to the container, having close contact with the ground. This contact keeps the root zone of the plant cooler in the summer and warmer in the winter because of increased heat transfer with the ground. The containers are preferably assembled by stapling or sewing along the edges of the sidewall, such as with a conventional sewing machine or a surger-type sewing machine.

The sidewall materials may be used to make containers of various sizes for use in growing various types of plants. The size or volume of the container may be enlarged for use in growing larger plants, or plants at a later state of development. For example, a container for a woody plant may be provided, with a diameter of 5 inches and a capacity of 1 gallon, a diameter of 18 inches and a capacity of 15 gallons, or a diameter of 72 inches and a capacity of 250 gallons or higher. Similarly, a smaller container may be provided for use in growing herbaceous dicotyledons, such as tomatoes or woody monocotyledons, such as palm trees. Optionally, handles may be cut into the tops of the container to permit grasping with the hand for ease of transport.

The present invention further provides methods of using the sidewalls in horticulture and recreational gardening. Rolls of the sidewall material, suitable for lining plant pots and other containers, may be produced. The sidewall may be used above ground by cutting strips of the bilayer and forming them into a lateral barrier lining the interior of a pot. For inhibition of roots growing in a basilar direction, a piece may be cut from the roll to line the bottom of the pot. However, in order for the sidewall to function optimally, it is necessary for the pot to have drain holes and it is beneficial for the drain holes to be very large to expose as much of the porous region of the sidewall as possible.

It should be apparent that the unique sidewall construction of the invention offers many advantages over existing systems or containers for preventing root circling and abnormal or weakened root growth, while promoting water conservation that minimizes any perched water table and provides proper aeration. Furthermore, because the various embodiments of the root growth barrier provide greater irrigation efficiency, aeration and cooler soil temperatures than do conventional plastic containers, the container promotes plants that are healthier overall and grow faster, whether the plants are ultimately transplanted or maintained permanently in the container.

Figure 1:
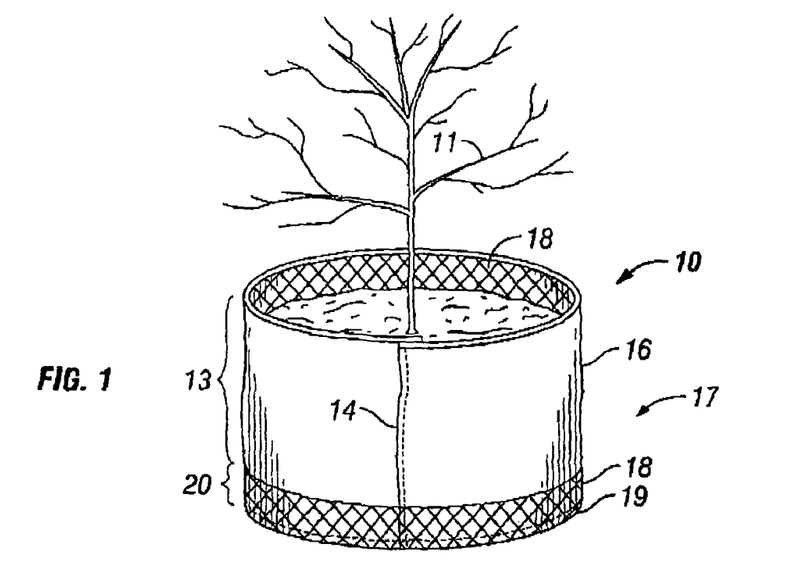
FIG. 1 is a perspective view of a container formed from the root growth barrier of the present invention with a tree growing therein.

Referring now to FIG. 1, a side elevational view of a container 10 of the invention with a tree 11 growing therein is illustrated. The container 10 has a sidewall 17 comprising a root-tip-trapping region 13 and a porous fabric region 20. The root-tip-trapping region 13 includes an inner layer of porous fabric 18 and an outer layer of a nonporous, root-impenetrable material 16. The nonporous, root-impenetrable material 16 is preferably white polyethylene to allow for greater reflectivity, light weight and strength, and results in a cooler container and soil temperatures as well as water conservation gains. The porous fabric 18 is preferably a dark colored spun bonded fabric that cooperates with the root-impenetrable layer, discussed above, to guide root tips to the outside to be air-root-pruned which stimulates root branching and prevents algal growth in the container. In the embodiment shown, the same porous fabric 18 forms the porous region 20. The container 10 is shown having a vertical seam 14 and a bottom perimeter seam 19 that may each be formed by sewing, stapling, or any other method of fastening the edges of the material.

Figure 2:
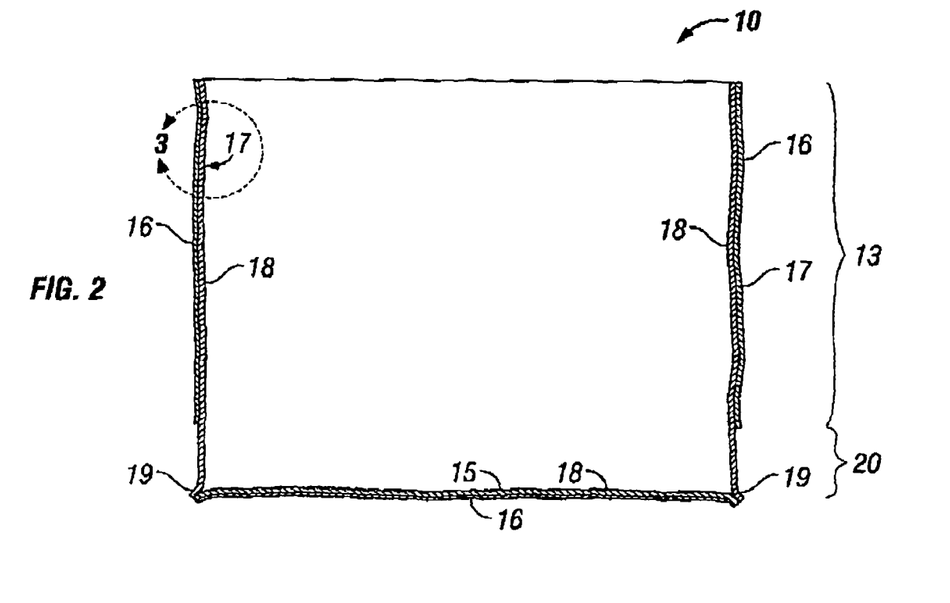
FIG. 2 is a cross-sectional side view of the container shown in FIG. 1.

FIG. 2 is a cross-sectional side view of the container 10 shown in FIG. 1, showing the construction of the sidewall 17 in greater detail. In the root-tip-trapping region 13, the root-impenetrable material 16 is laminated together with the porous fabric 18, which may be any fabric that would trap roots as they grow into the fabric layer. Seams 19 are shown coupling a floor or bottom 15 to the sidewalls 17 of the barrier to form the container 10. The bottom 15 is preferably a bilayer material like that used in the root-tip-trapping region 13.

Figure 3:
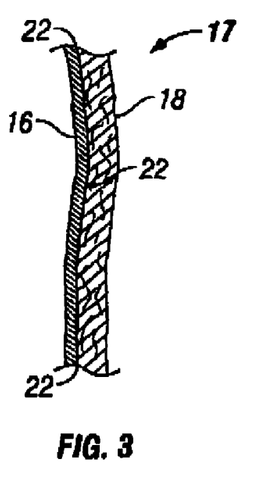
FIG. 3 is a partial cross-sectional view of the root growth barrier shown in FIG. 2.

FIG. 3 is a partial cross-sectional view of the root-tip-trapping region 13 of the sidewall 17 shown in FIG. 2, more clearly illustrating its bilayer structure. In a preferred embodiment of the invention, the bonding interface or region 22 between the layers is formed by laminating the root-impenetrable material 16, such as a polyethylene film, onto a porous fabric 18.

Figure 4:
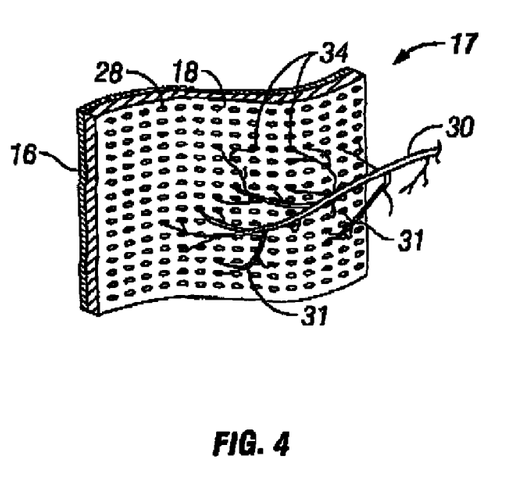
FIG. 4 is a partial perspective view of a root growth barrier having a knit-type fabric layer providing a high-density of discrete root-tip-trapping elements.

FIG. 4 is a partial perspective view of the same root-tip-trapping region 13 of the sidewall 17 shown in FIG. 3 having a porous fabric 18, such as a knit-type fabric, providing a high-density of discrete root-tip-trapping elements 28. Plant roots 30 extend through a growth medium (not shown) to penetrate into the fabric layer 28 and root tips 34 that become trapped against the root-impenetrable layer 16. As a result of root tips 34 becoming trapped, the root tips 34 swell somewhat, become more thick-bodied, give up control and allow side branches 31 to grow. This new root side branching occurs back approximately 4 inches from the tumescent root tip. These new side branches undergo a similar process when they become trapped in the sidewall 17.

Figure 5:
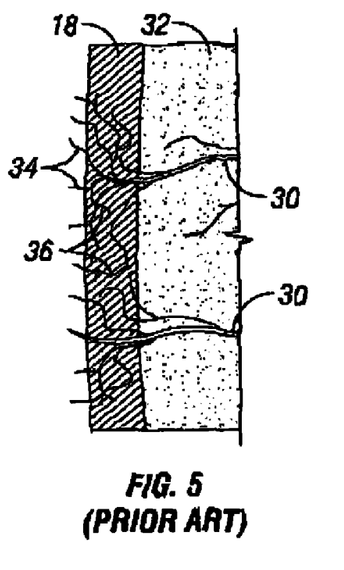
FIG. 5 is a partial cross-sectional view of a prior art air root pruning container.

FIG. 5 is a partial cross-sectional view of a porous fabric 18 in the air-root-pruning region 20 of the container 10 suitable for air-root-pruning. The roots 30 are allowed to extend through the fabric 18 such that the root tips 34 are exposed to the surrounding air where the root tips become dehydrated and die. Side branches 36 then grow mostly behind the material 18 and may later become air root pruned as well. It should be noted that some growth of root side branches 36 occurs within the material 18. However, because the roots pass through the material 18, many of these roots will be broken off when the fabric is removed. It should also be noticed that the fabric is porous and, as such, there is no barrier to water loss by either drainage or evaporation from the soil 32.

Figure 6:
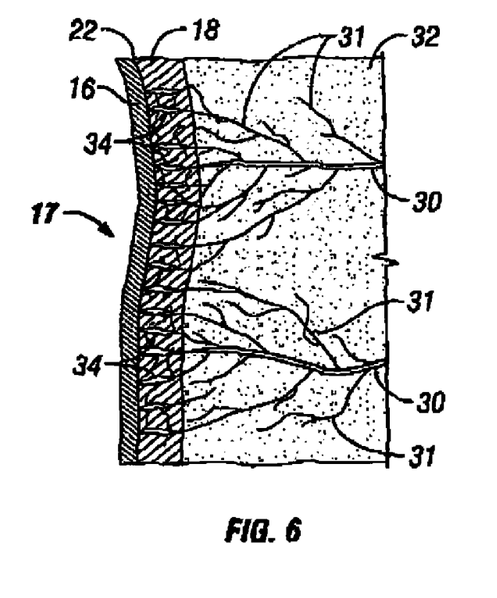
FIG. 6 is a partial cross-sectional view of the root growth barrier of FIG. 3 illustrating how root tips enter into the root-tip-trapping layer, impinge upon the root-impenetrable layer, become trapped, and experience enhanced root branching.

FIG. 6 is a partial cross-sectional view of the sidewall 17 in the root-tip-trapping region 13 of the container 10 (similar to FIG. 3) illustrating how the tips 34 of the roots 30 enter into the layer of porous fabric 18 and impinge upon the root-impenetrable material 16 to become trapped. As in FIG. 4, it is an important effect of the invention that the root tips 34 swell and allow enhanced root side branches 31 to grow within the growth medium 32. Accordingly, when the plant is removed from the sidewall 17, or a container 10 made there from, the roots 31 will not be lost. In fact, the sidewall 17 may be easily peeled away from the roots with little or no damage to the roots.

Figure 7:
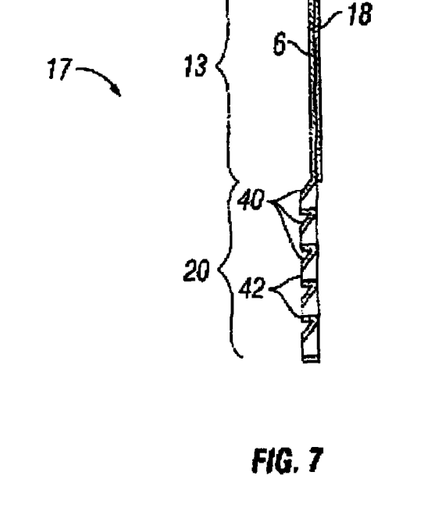
FIG. 7 is a cross-sectional side view of a container sidewall showing an air-root-pruning region that includes protuberances having outwardly extending distal ends that are open.

FIG. 7 is a cross-section side view of a container sidewall 17 showing an air-root-pruning region that includes protuberances having outwardly extending distal ends that are open. The container sidewall 17 is made from a bendable sheet 16 having a root-tip-trapping region 13 formed by bonding a suitable porous fabric 18 to the inside surface of the sheet 16 in combination with an air-root-pruning region 20 having open-ended protuberances.

Figure 8:
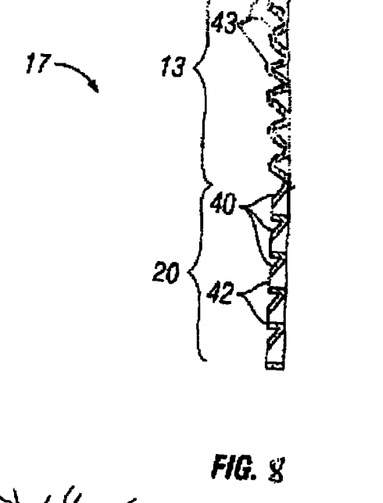
FIG. 8 is a cross-sectional side view of a container sidewall showing a root-tip-trapping region that includes protuberances having outwardly extending distal ends that are closed to trap roots.

FIG. 8 is a cross-sectional side view of a container sidewall 17 showing a root-tip-trapping region 13 that includes protuberances 43 having outwardly extending distal ends that are closed to trap roots, in combination with an air-root-pruning region 20 that include protuberances having outwardly extending distal ends that are open.

Figure 9:
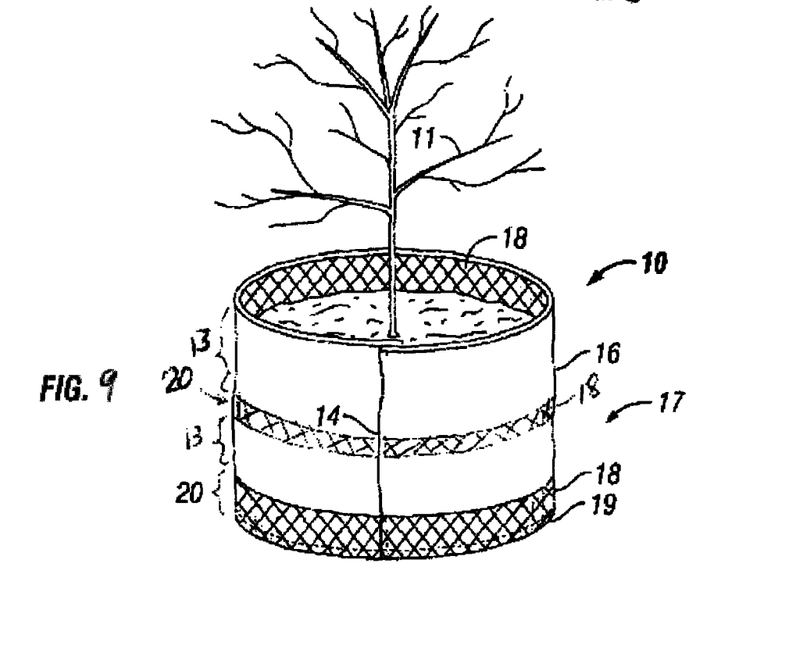
FIG. 9 is a perspective view of a container formed with a sidewall include two root-tip-trapping regions and two air-root-pruning regions.

FIG. 9 is a perspective view of a container formed with a sidewall include two root-tip-trapping regions 13 and two air-root-pruning regions 20 arranged in a pattern of rows. Each of the regions 13, 20 may be formed and used, for example, in a manner consistent with FIGS. 1-8 and the description herein.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention.

It should be understood from the foregoing description that various modifications and changes may be made in the preferred embodiments of the present invention without departing from its true spirit. It is intended that this foregoing description is for purposes of illustration only and should not be construed in a limiting sense. Only the language of the following claims should limit the scope of this invention.

What is claimed is:

1. A sidewall for a plant container, comprising:
   a substantially water-impermeable root-tip-trapping region; and
   a porous air-root-pruning region adjacent the root-tip-trapping region, wherein the root-tip-trapping region is a contiguous upper portion of the sidewall and the air-root-pruning region is a contiguous lower portion of the sidewall.

2. The sidewall of claim 1, wherein the root-tip-trapping region is colinear with the air-root-pruning region.

3. The sidewall of claim 1, wherein the root-tip-trapping region comprises a porous fabric layer bonded to a layer of a root-impenetrable material.

4. The sidewall of claim 3, wherein the root-impenetrable material is water-impermeable.

5. The sidewall of claim 4, wherein the porous fabric layer of the root-tip-trapping region extends beyond the layer of root-impenetrable material to form the porous air-root-pruning region.

6. The apparatus of claim 5, wherein the porous fabric is a spun bonded, needle punched fabric.

7. The apparatus of claim 6, wherein the fabric has a density between 2 and 10 ounces per square yard.

8. The apparatus of claim 5, wherein the root-impenetrable layer comprises polyethylene and the porous fabric comprises spun bonded fabric.

9. The apparatus of claim 8, wherein the polyethylene has a thickness between 2 and 10 mils.

10. The sidewall of claim 5, wherein the layer of root-impenetrable material is disposed over ½ to 9/10 of the porous fabric layer.

11. The sidewall of claim 3, wherein the porous fabric has a weight between 2 and 10 ounces per square yard.

12. The sidewall of claim 3, wherein the porous fabric has a weight between 4 and 6 ounces per square yard.

13. The sidewall of claim 3, wherein the porous fabric has openings between 1/16 and ¼ inch.

14. The sidewall of claim 3, wherein the porous fabric is a spun bonded, needle punched fabric.

15. The sidewall of claim 3, wherein the porous fabric is selected from polyester, polypropylene or other olefin fiber.

16. The sidewall of claim 3, wherein the porous fabric is a woven or knitted fabric.

17. The sidewall of claim 3, wherein the porous fabric is degradable.

18. The sidewall of claim 3, wherein the porous fabric is cotton.

19. The sidewall of claim 3, wherein the porous fabric is opaque.

20. The sidewall of claim 19, wherein the porous fabric is black or gray.

21. The sidewall of claim 19, wherein the root-impenetrable layer is pervious to UV radiation.

22. The sidewall of claim 3, wherein the porous fabric is bonded onto the root-impenetrable material by a method selected from gluing, laminating and combinations thereof.

23. The sidewall of claim 3, wherein the root-impenetrable material is reflective.

24. The sidewall of claim 3, wherein the root-impenetrable material is a polymer sheet.

25. The sidewall of claim 3, wherein the root-impenetrable material is selected from polyethylene and polypropylene.

26. The sidewall of claim 3, wherein the root-impenetrable material is metal.

27. The sidewall of claim 3, wherein the root-impenetrable material is a metal foil.

28. The sidewall of claim 3, wherein the root-impenetrable material is white.

29. The sidewall of claim 3, wherein the root-impenetrable layer has a thickness between 2 and 10 mils.

30. The sidewall of claim 3, wherein the root-impenetrable layer has a thickness between 3 and 5 mils.

31. The sidewall of claim 3, wherein the root-impenetrable material is biodegradable.

32. The sidewall of claim 31, wherein the biodegradable material is selected from wood, fiber, starch, polyhydroxyalkanoates, polycaprolactone, polylactide aliphatic copolymer, polylactide, aliphatic polyester, an aliphatic-aromatic copolymer, and combinations thereof.

33. The sidewall of claim 3, wherein the porous fabric layer of the root-tip-trapping region extends beyond the layer of a root-impenetrable material to form the air-root-pruning region.

34. The sidewall of claim 1, wherein the root-tip-trapping region comprises between ½ and 9/10 of the sidewall.

35. The sidewall of claim 1, wherein the root-tip-trapping region comprises between ⅔ and ¾ of the sidewall.

36. The sidewall of claim 1, wherein the sidewall is flexible, rigid, or a combination thereof.

37. The sidewall of claim 1, wherein the root-tip-trapping and air-root-pruning regions form a bendable sheet.

38. The sidewall of claim 1, wherein the air-root-pruning region includes protuberances having outwardly extending distal ends that are open.

39. The sidewall of claim 1, wherein the root-tip-trapping region includes protuberances having outwardly extending distal ends that are closed to trap roots.

40. The sidewall of claim 1, wherein the sidewall has an edge that is secured by a method selected from sewing, gluing, plastic welding, hooking, rivoting, screwing, bolting, bonding, and combinations thereof.

41. The sidewall of claim 1, wherein the root-tip-trapping region comprises greater than 10 root-tip-trapping elements per square inch.

42. The sidewall of claim 1, wherein the sidewall is an integral part of a container.

43. The sidewall of claim 1, wherein the sidewall is a discrete panel that can form a container.

44. A sidewall for a plant container, comprising:
a substantially water-impermeable root-tip-trapping region; and
a porous air-root-pruning region adjacent the root-tip-trapping region, wherein the root-tip-trapping region comprises between ½ and 9/10 of the sidewall.

45. The sidewall of claim 44, wherein the root-tip-trapping region comprises between ⅔ and ¾ of the sidewall.

46. The sidewall of claim 44, wherein the root-tip-trapping region comprises a porous fabric layer bonded to a layer of a root-impenetrable material.

47. The sidewall of claim 46, wherein the porous fabric layer of the root-tip-trapping region extends beyond the layer of root-impenetrable material to form the porous air-root-pruning region.

48. The sidewall of claim 44, wherein the regions are configured in a pattern selected from rows, columns, dots, checkerboard, and combinations thereof.

49. A sidewall for a plant container, comprising:
a substantially water-impermeable root-tip-trapping region; and
a porous air-root-pruning region adjacent the root-tip-trapping region, wherein the root-tip-trapping and air-root-pruning regions form a bendable sheet.

50. The sidewall of claim 49, wherein the regions are configured in a pattern selected from rows, columns, dots, checkerboard, and combinations thereof.

51. The sidewall of claim 49, wherein there are two or more root-tip-trapping regions.

52. The sidewall of claim 49, wherein there are two or more air-root-pruning regions.

53. The sidewall of claim 49, wherein the root-tip-trapping region comprises between ½ and 9/10 of the sidewall.

54. The sidewall of claim 49, wherein the root-tip-trapping region comprises between ⅔ and ¾ of the sidewall.

55. The sidewall of claim 49, wherein the root-tip-trapping region comprises a porous fabric layer bonded to a layer of a root-impenetrable material.

56. The sidewall of claim 55, wherein the porous fabric layer of the root-tip-trapping region extends beyond the layer of root-impenetrable material to form the porous air-root-pruning region.

* * * * *